Dec. 22 1925.
C. H. GERSTING
PISTON RING
Filed Jan. 7, 1925
1,566,532
2 Sheets-Sheet 1
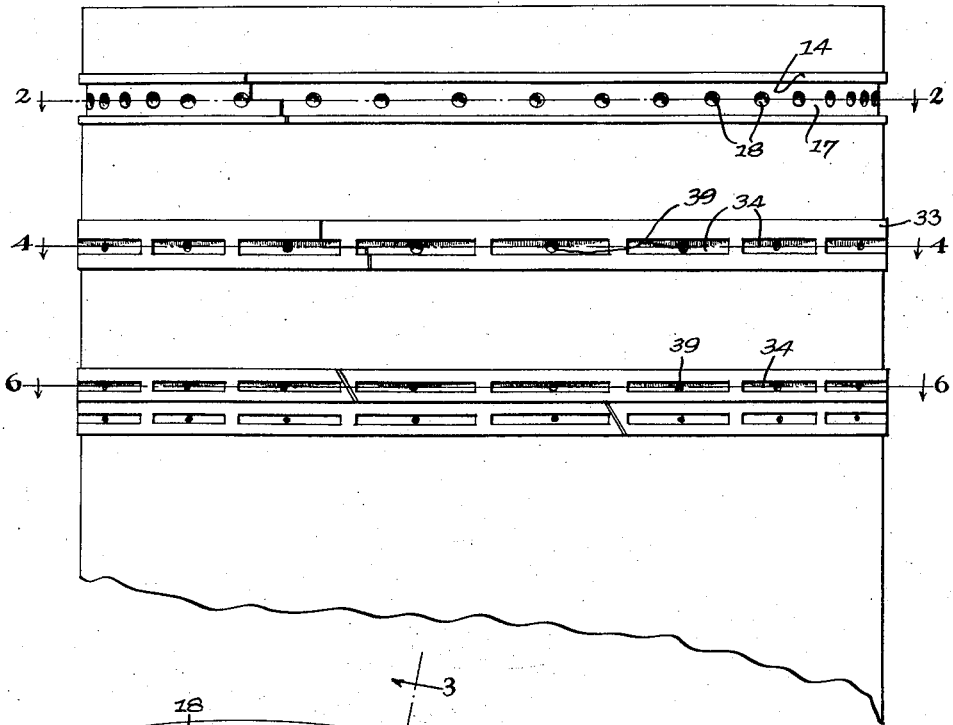
Fig. 1
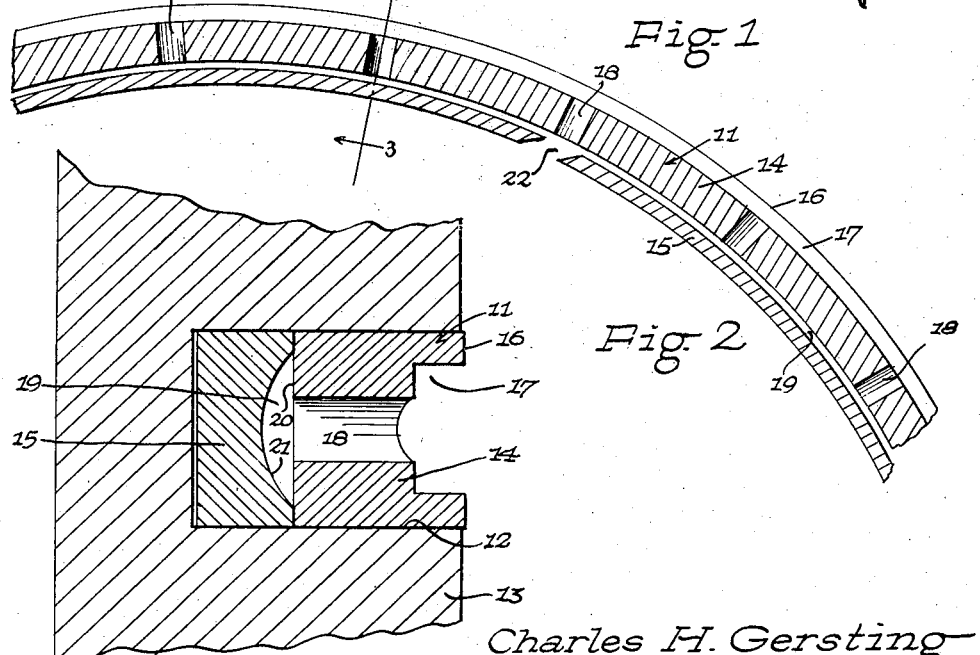
Fig. 2
Fig. 3
Charles H. Gersting
Inventor
by Smith and Grierman
Attorneys

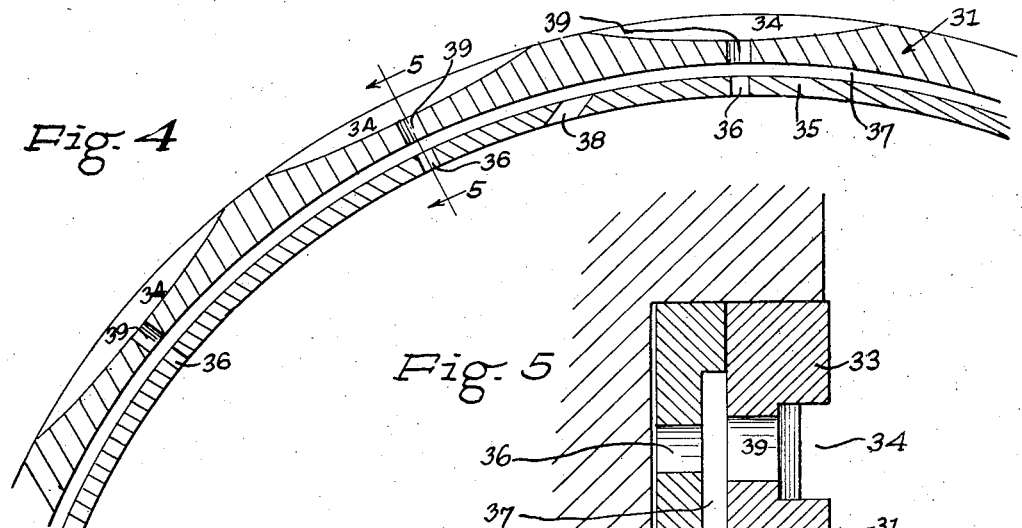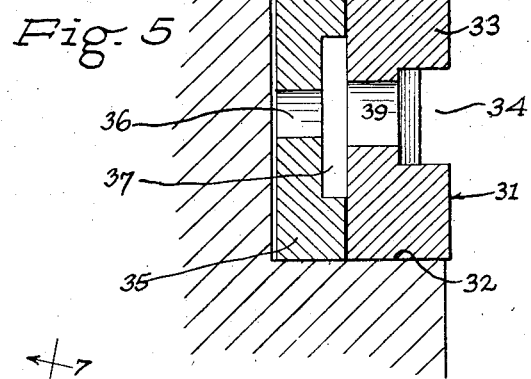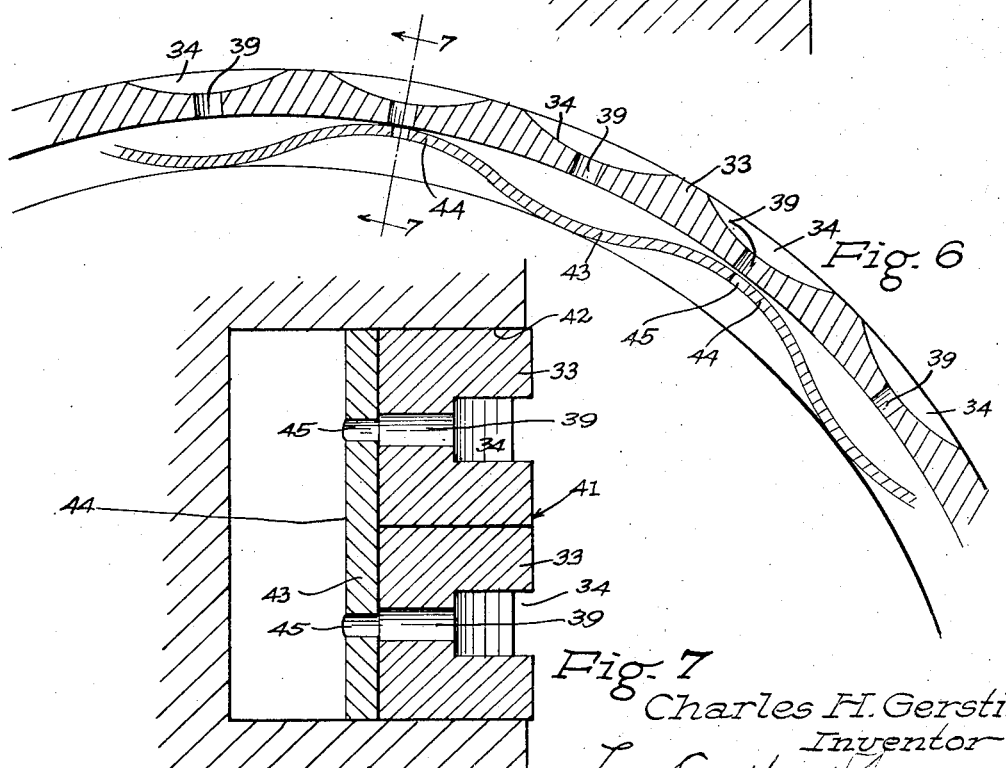

Patented Dec. 22, 1925.

1,566,532

UNITED STATES PATENT OFFICE.

CHARLES H. GERSTING, OF BUFFALO, NEW YORK.

PISTON RING.

Application filed January 7, 1925. Serial No. 953.

*To all whom it may concern:*

Be it known that I, CHARLES H. GERSTING, a citizen of the United States of America, and a resident of Buffalo, in the county of Erie and State of New York, have invented certain new and useful Improvements in Piston Rings, of which the following is a full, clear, and exact description.

Under ordinary conditions the fluid within a cylinder is afforded access to the inner face of the piston ring in such manner that substantially the full pressure within the cylinder is transmitted to the inner face of the ring and acts to press the outer face of the ring against the cylinder wall. In order to prevent the piston ring from twisting and turning it is necessary to form the ring of appreciable width and accordingly it is necessary to form this inner face of the piston ring of considerable area with the result that the outer face of the piston ring is usually pressed against the cylinder wall with a pressure far in excess of that required to effect a proper seal. It is of course well known that the total friction loss is proportional to the total pressure with which the surfaces engage each other, and it is therefore readily apparent that this great excess of pressure of the piston ring against the cylinder wall causes a great excess of friction loss. My invention provides a ring which offers the requisite resistance to twisting and turning yet materially and appreciably reduces the net force with which the fluid presses the outer face of the ring against the cylinder wall and therefore appreciably reduces the loss resulting from the friction between the piston ring and the cylinder wall.

In the drawings accompanying this specification and forming a part thereof I have shown, for purposes of illustration, three forms each embodying part or all of the advantages of my invention. In these drawings:

Figure 1 is a side elevation of a piston carrying each of these three illustrative forms of a ring.

Figure 2 is an enlarged fragmentary section on the line 2—2 of Figure 1,

Figure 3 is a section on the line 3—3 of Figure 2,

Figure 4 is an enlarged fragmentary section on the line 4—4 of Figure 1,

Figure 5 is a section on the line 5—5 of Figure 4,

Figure 6 is an enlarged fragmentary section on the line 6—6 of Figure 1, while

Figure 7 is a section on the line 7—7 of Figure 6.

The piston ring 11 particularly shown in Figures 2 and 3 is seated within a piston ring groove 12 in the piston 13 and comprises an outer bearing ring 14 preferably formed of suitable low friction material, therefore not possessed of sufficient resiliency to form a tight seal with the cylinder wall before or at the time the fluid is being introduced into the cylinder, and accordingly preferably supplemented by a resilient inner ring 15 arranged to constantly urge the outer ring 14 into contact with the cylinder wall. The ring 14 herein illustrated is formed of the usual width, and accordingly of a width sufficient to prevent twisting and turning of the ring, but the total action of the fluid tending to force the ring 14 against the cylinder wall is decreased by providing in the outer face 16 of the ring 14 an annular depression 17 preferably disposed centrally of the face 16 and connected to the piston ring groove 12, and thus with the interior of the cylinder, by means of a plurality of apertures 18 extending through the outer ring 14 to an annular chamber 19 disposed between the inner face 20 of the outer ring 14 and the outer face 21 of the inner ring 15, and opening into the piston ring groove 12 through the gap 22 between the two ends of the spring ring 15.

In the embodiment of my invention disclosed in detail in Figures 4 and 5, the piston ring 31 is seated in the piston ring groove 32, the outer ring 33 is provided with a plurality of circumferentially elongated recesses 34 replacing the single annular recess 16 of the ring 14, and the inner ring 35 is provided with a plurality of apertures 36 extending from the annular recess 37 to the piston ring groove 32 and thus affording, between the annular recess 37 and the piston ring groove 32, communication additional to that afforded by the gap 38 between the two ends of the ring 35, and the apertures 39 in the outer ring 33 are so spaced that one aperture 39 is disposed centrally of each segmental recess 34.

In the embodiment of my invention disclosed in detail in Figures 6 and 7 the piston ring 41 is seated within the piston ring groove 42 and comprises two of the outer rings 33 backed and urged outwardly by a single sinuous spring ring 43 engaging the rings 33 at its periodic convexities 44 and provided at the periodic convexities 44 with apertures 45 arranged to continue the apertures 39 of the rings 33 in the event that any convexities 44 of the spring 43 happen to be disposed opposite apertures 39 of an outer ring 33.

From the above description it will be understood that in each of the embodiments of my invention herein shown and described the fluid will flow from the piston ring groove freely into the recessed portion of the outer face of the outer ring and act against the surface of this recessed portion to counteract to that extent the force resulting from the action of the fluid against the inner face of the piston ring. It will therefore be understood that in each of the embodiments of my invention herein disclosed the total action of the fluid urging the piston ring into engagement with the cylinder wall is substantially decreased yet without decreasing the width of the piston ring and accordingly while retaining the full advantages of the practically necessary wide piston ring. It will therefore be obvious that each of the embodiments of my invention herein disclosed accomplishes the principal purpose of my invention.

On the other hand, it will also be obvious to those skilled in the art that the various embodiments of my invention herein illustrated possess advantages other than those specifically set forth herein, and, in addition, that the particular embodiments disclosed herein may be variously changed and modified without departing from the spirit of my invention or sacrificing the advantages thereof. It will be understood, therefore, that this disclosure is illustrated only and that my invention is not limited thereto.

I claim:

In combination: a piston provided with a piston ring groove; a relatively low friction soft non-resilient outer ring disposed in said groove, provided on its outer face with a central annular series of elongated recesses extending the entire periphery of said ring, and provided with a plurality of apertures one opening from each of said recesses to the inner face of said ring; and a highly resilient split inner ring disposed in said groove with the marginal parts of its outer face engaging the two edge portions of the inner face of said outer ring, effective to hold said outer ring in contact with the cylinder wall, and provided on its outer face between said marginal parts with a single central annular recess lying in communication with the inner ends of all of said apertures and extending the entire periphery of said inner ring.

In testimony whereof, I hereunto affix my signature.

CHARLES H. GERSTING.